United States Patent [19]

Rutherford

[11] 4,107,907
[45] Aug. 22, 1978

[54] CUTTER BLADE GUARD FOR MOWERS

[76] Inventor: Harry T. Rutherford, 609 N. Second St., Martinsburg, W. Va. 25401

[21] Appl. No.: 716,871

[22] Filed: Aug. 23, 1976

[51] Int. Cl.$^2$ ............................................. A01D 75/20
[52] U.S. Cl. ...................................... 56/320.2; 56/17.4
[58] Field of Search .................. 56/320.2, 320.1, 17.4, 56/255

[56] References Cited

U.S. PATENT DOCUMENTS

| | | | |
|---|---|---|---|
| 2,017,524 | 10/1935 | Bolens | 56/17.4 |
| 2,578,880 | 12/1951 | Doyle | 56/320.2 |
| 3,391,524 | 7/1968 | Nickoloff et al. | 56/320.2 |
| 3,404,519 | 10/1968 | Demers | 56/320.2 |
| 3,601,960 | 8/1971 | Buechler | 56/320.2 |
| 3,706,189 | 12/1972 | Rutherford | 56/320.2 |
| 4,008,559 | 2/1977 | Lessig et al. | 56/320.2 |

*Primary Examiner*—Jay N. Eskovitz
*Attorney, Agent, or Firm*—J. Wesley Everett

[57] ABSTRACT

A rotary type mower having a rotary cutting blade positioned to be rotated within an open bottom housing in which the blade tips are rotated in close proximity of the inner surface and adjacent the bottom of the housing. Extending about the housing and adjacent its bottom is a safety guard extending outwardly in substantially the same plane as the bottom edge of the housing. Portions of the guard are hinged to be raised to at least a vertical position for allowing the mower to be moved closer to objects that would otherwise not be available to the cutter blade. These hinged portions are placed about the housing at any desirable location and in any predetermined numbers and are operated by means extending to some remote place, such as the guiding handle of the mower or to the steering wheel or steering bar of a riding mower. This moving means is also provided with a lock which locks the hinged portion of the guard in its outwardly extended position.

2 Claims, 17 Drawing Figures

CUTTER BLADE GUARD FOR MOWERS

SPECIFICATIONS

This invention relates primarily to the safety feature for rotary mowing machines in which there is a horizontal cutter blade rotatable within an open bottom housing as depicted in my prior U.S. Pat. Nos. 3,680,295, dated Aug. 1st, 1972, and 3,706,189, dated Dec. 19, 1972, in which is shown a shroud extending about the housing adjacent the bottom edge of the housing to prevent the operator from accidentally coming in contact with the blade. This arrangement is perfectly satisfactory for open spaces mowing; however, there are times when it is desirable to move the mower closer to objects which would otherwise be out of reach of the cutter blade.

It is, therefore, the primary object of the invention to provide substantially horizontally extended safety guard on the mower housing with an outer hinged portion adapted to allow the portion of the guard to be moved to a vertical position adjacent the housing to allow the mower to pass in close proximity to various objects.

Another object of the invention is to provide means for the hinged portion of the guard to be operated from a remote position, such as the handle means normally an element of the mower, or the steering wheel or steering bar of a riding mower.

A further object of the invention is to provide a locking means for locking the hinged portion of the guard in its normal lateral position.

While several objects of the invention have been set forth, other objects, uses and advantages will become apparent as the nature of the invention is more fully disclosed, which consists in its novel construction, arrangement and combination of its several parts illustrated in the accompanying drawings and described in the detailed description to follow.

In referring to the drawings in more detail, like and similar reference characters are used to designate like and similar parts throughout the several views.

The mower may be of any conventional horizontal rotating blade type, whether of the walking or riding type, in which the cutter blade 2 is rotatable horizontally within a housing 3 by any suitable means, such as a motor 6, either electrically operated, or operated by an internal combustion engine. In certain types of mowers, particularly the heavier type, the motors are sometimes offset from the cutter blade shaft 8 and the cutter blade is generally operated by a suitable belt (not shown). The cuttings are discharged through a suitable chute B shown in FIGS. 1 and 2.

The invention relates primarily to a cutter blade guard for preventing injury to a person operating the mower. The distance from the outer end of the blade to the outer edge of the guard is is such that the feet or fingers will not extend beneath the housing and into the path of the outer end of the cutter blade.

The cutter blade guard may take a number of forms and equivalents as shown in the several views.

Figure 1:
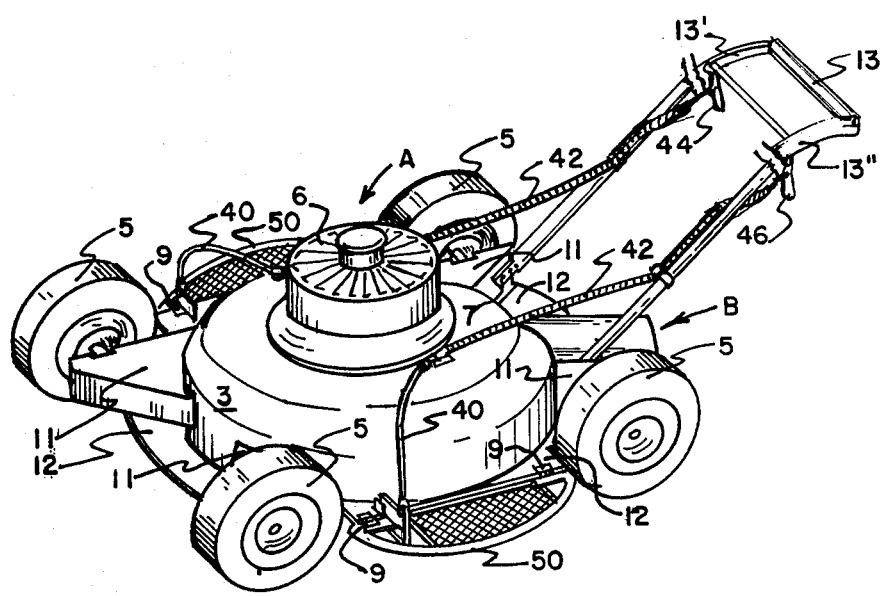
FIG. 1 is a perspective view of a wheel supported walking push type mower showing a guarded rotary cutter blade adapted to rotate within an open bottom housing and in a horizontal plane.

FIG. 1 shows an assembly of a wheel supported, -hand- guided mower A equipped with improved movable blade guards of the type shown at 50 in FIG. 1. This type mower is supported upon wheels 5 for moving the mower over a desired surface. The mower is manipulated by the handle 13 having its free ends 13' and 13" connected with the mower housing 3 by bolts 7, or in any other suitable manner. The wheels 5 are supported upon axles carried by suitable bosses 11 fixed to the housing.

Figure 2:
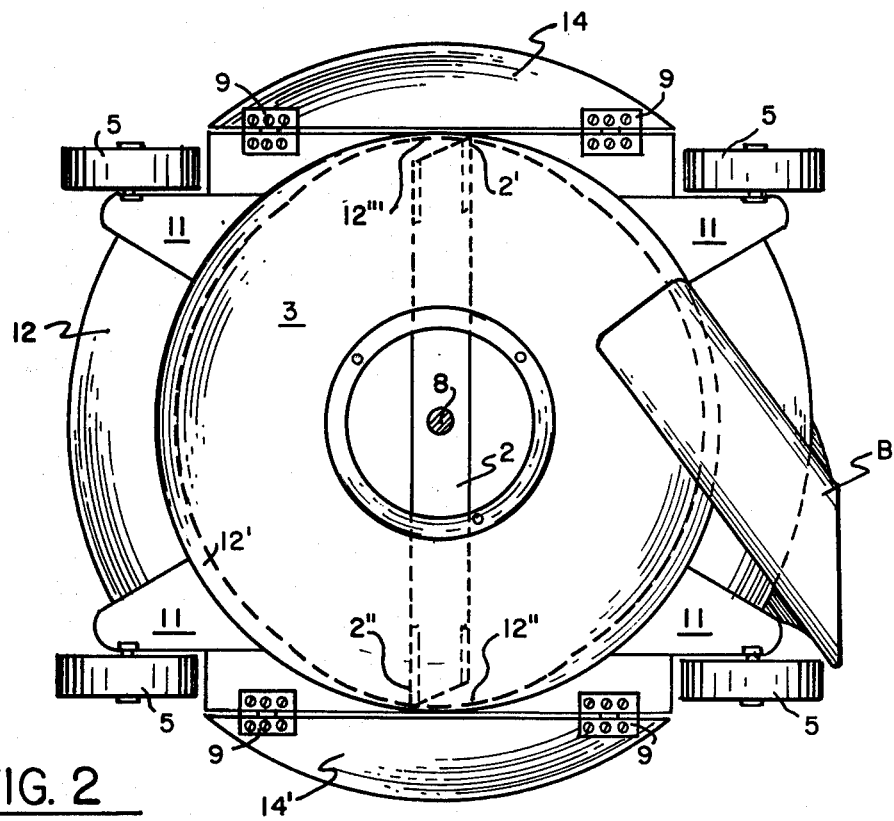
FIG. 2 is a top plan view of a mower housing showing one form of a cutter blade guard attached thereto.
Figure 3:
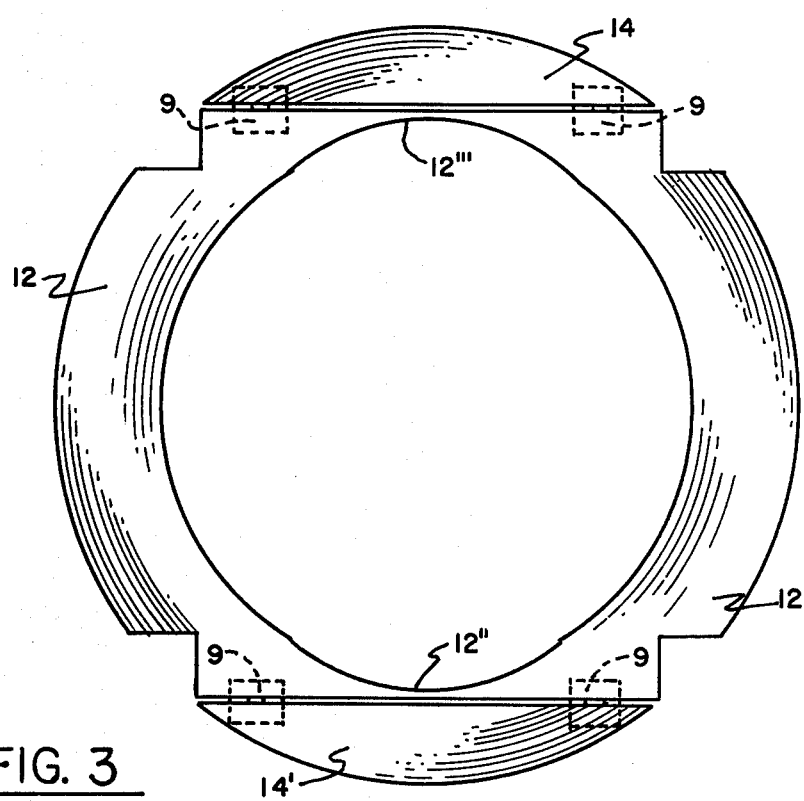
FIG. 3 is a bottom view of the form of cutter blade guard shown in FIG. 2 unattached from the mower housing.
Figure 6:
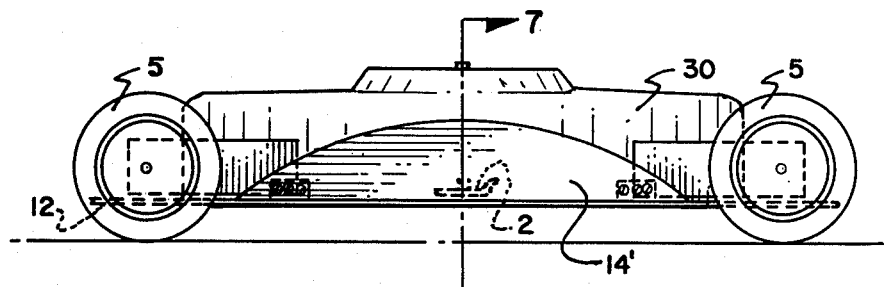
FIG. 6 is a side elevational view of a mower including a housing and a cutter blade guard.
Figure 7:
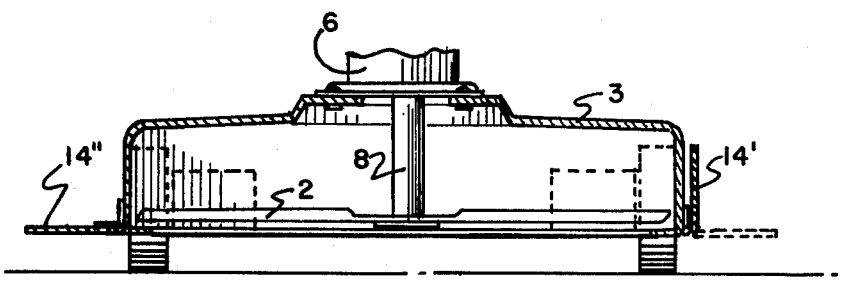
FIG. 7 is a sectional view taken on line 7—7 of FIG. 6.

The hinged section of the cutter blade guard may be formed separately and attached to the type of cutter blade guard shown in my U.S. Pat. Nos. 3,680,295 and 3,706,189. These attached sections are best shown at 14 and 14' in FIGS. 2 and 3, and require very few parts and very little effort and cost. In this variation the continuous shroud 12, shown in FIG. 3, is fixed adjacent the lower edge of the housing 3, as shown in FIGS. 6 and 7, in any suitable manner. The inner edge of the shroud extends inwardly of the hollow housing 3, as shown at 12' in FIG. 2. The hinged sections 14 and 14' are attached to the shroud by suitable hinges 9 and are located at the side of the mower in respect to the general cutting direction the mower is operated in. In a hand-manipulated mower, as shown in FIGS. 1 and 6, the axes of the hinges are on a line perpendicular to the axis of the supporting wheels 5.

The width of the portion 12' of the shroud 12 extending inwardly of the housing 3 is reduced to width at the two opposite sides of the housing adjacent the hinged portions of the cutter blade guard as shown at 12" and 12''' (FIG. 2) to allow only a reduced portion of the tips 2' and 2" of the cutter blade 2 to overlap the portions 12" and 12'" of the guard element in these areas.

Figure 4:
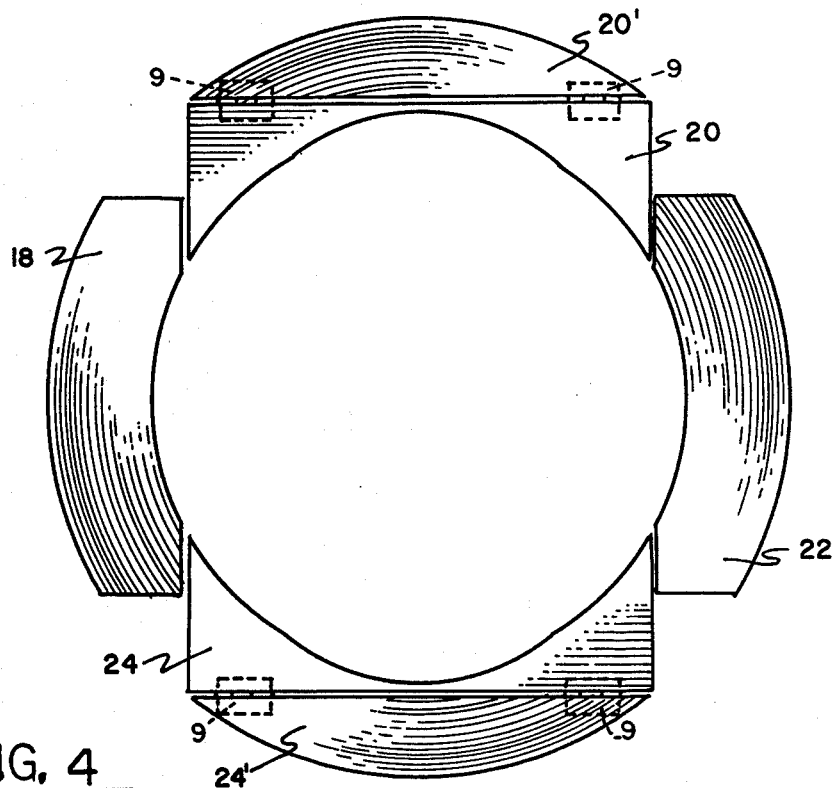
FIG. 4 is a form of a cutter guard formed in sections which are adapted to be attached to a mower housing similar to that shown in FIGS. 1 and 2.
Figure 5:
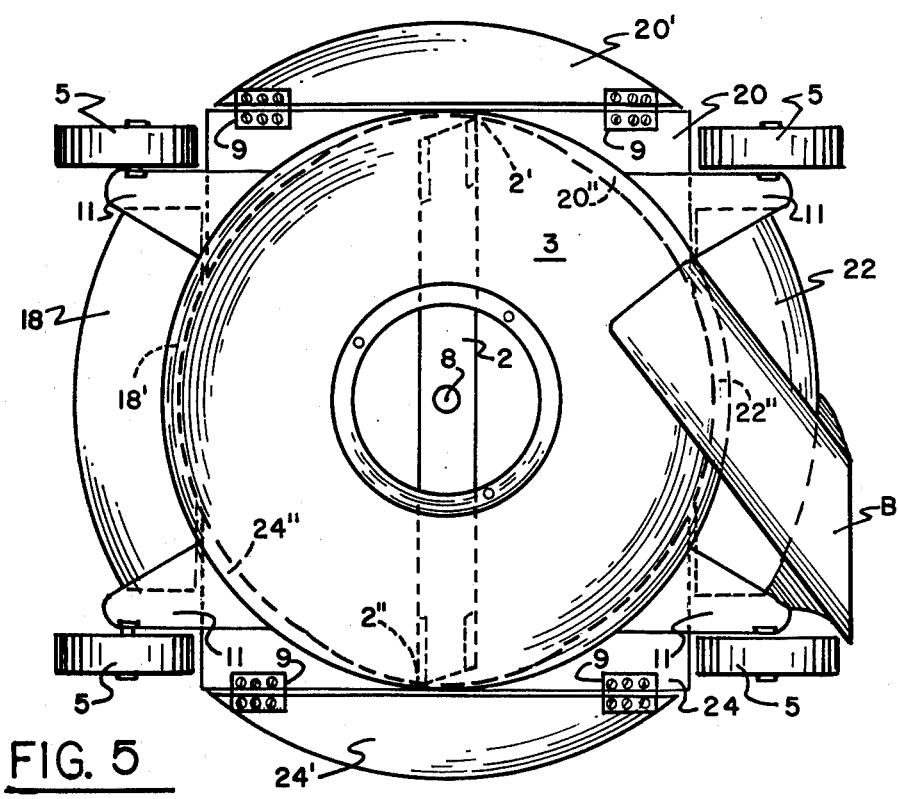
FIG. 5 is a top plan view of a mower housing showing the guard sections shown in FIG. 4 fixed about a mower housing.
Figure 8:
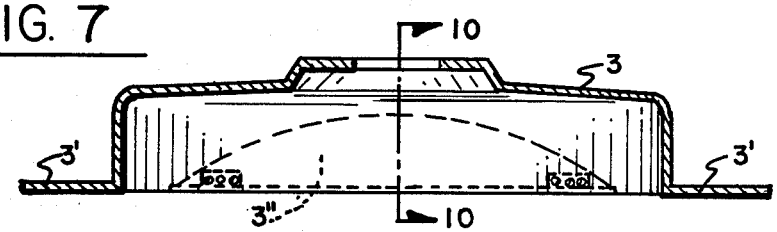
FIG. 8 is a sectional view of a mower housing showing the cutter guard as a part of the mower housing.
Figures 9, 10:
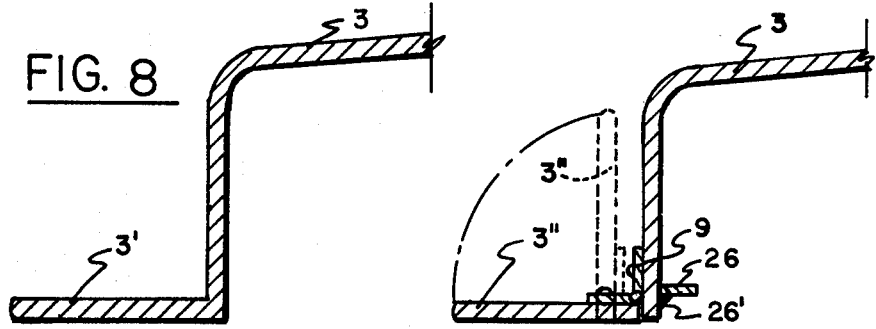
FIG. 9 is an enlarged fragmentary sectional view similar to FIG. 8 showing the combination housing and cutter blade guard on a larger scale.
FIG. 10 is a fragmentary sectional view of a mower housing similar to that shown in FIG. 9 taken on the line 10—10 of FIG. 8.

FIGS. 4 and 5 show the guard member formed in sections 18, 20, 22 and 24. The side sections 20 and 24 are provided with hinged portions 20' and 24' similar to those previously described for the hinged portions 14 and 14' as shown in FIGS. 2 and 3. FIGS. 4 and 5 also show portions 18', 20", 22' and 24" of the above mentioned sections extending inwardly of the housing 3; however, the extended portions 20" and 24" are reduced in area adjacent the hinged portions 22' and 24' as previously described for the extended portion 12' of the shroud 12 shown in FIG. 2. While it is desirable, it is not always necessary to have the cutter blade guard extend inwardly of the housing as part of the shroud 12 as shown at 12', or of the sections shown at 18', 20", 22' and 24", in FIG. 5. The outer fixed portion of the cutter guard may be formed as a part of the housing as shown in FIGS. 8 and 10 at 3'. A separate member 26 may be secured to the inner surface of the housing as shown at 26' in FIG. 10 having the same configuration as described for the extended portion 12' of the shroud or of the separate sections extending beyond the housing 3.

Figure 14:
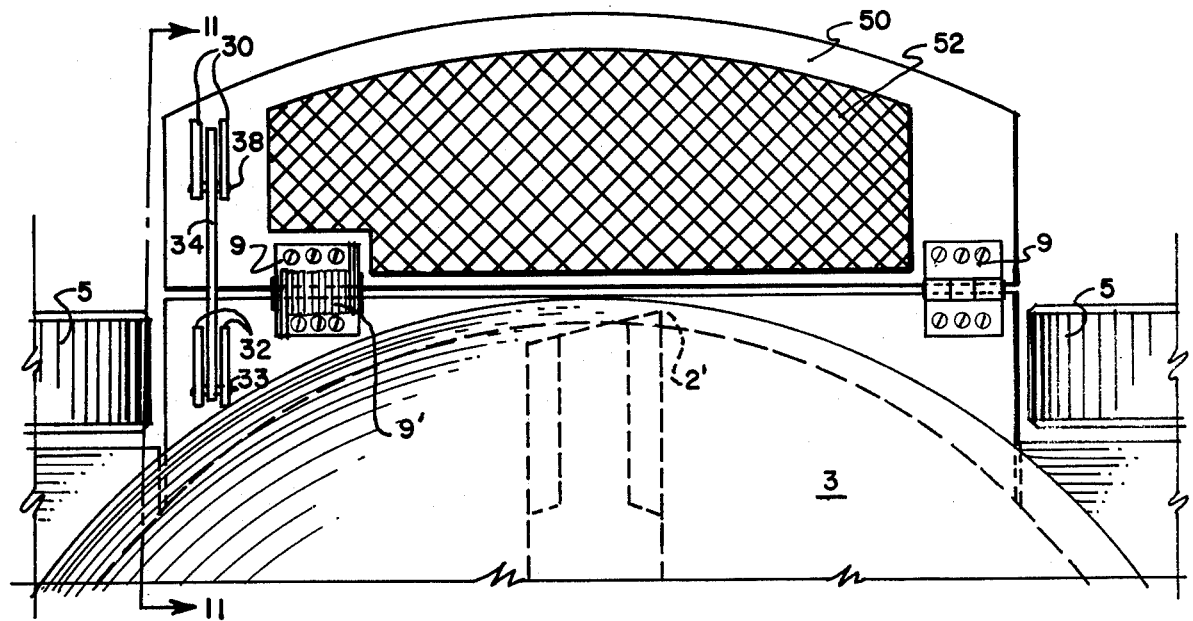
FIG. 14 is an enlarged fragmentary top view showing a modified form of the hinged portion of the cutter blade guard.
Figure 15:
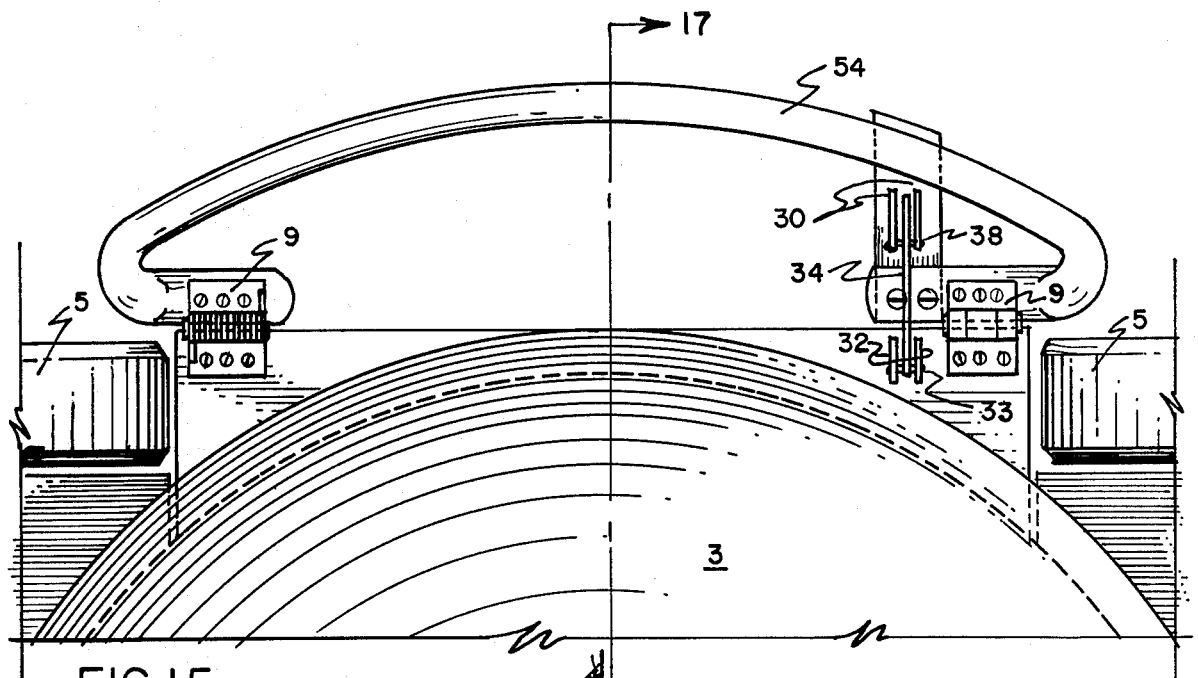
FIG. 15 is a fragmentary top plan view of a still further modified form of hinged guard element.
Figure 17:
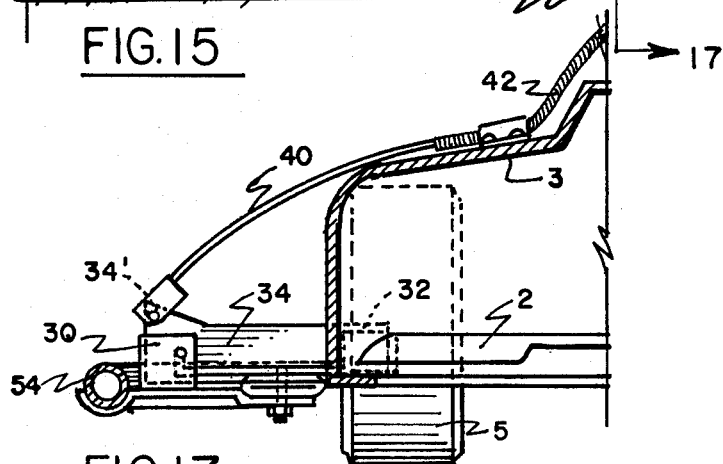
FIG. 17 is a sectional view taken on line 17—17 of FIG. 15.
Figure 16:
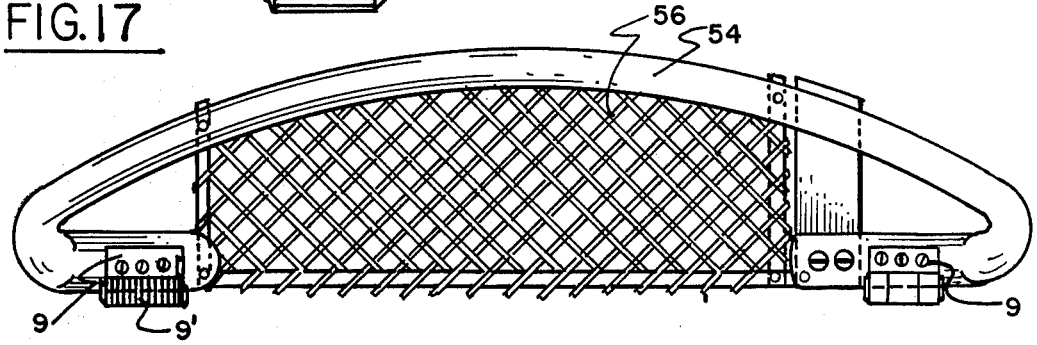
FIG. 16 is a top plan view of another modification of the hinged portion of the guard.

The hinged portion of the cutter blade guard may take various forms as shown in FIGS. 14, 15 and 16. In FIG. 14 there is illustrated a hinged member 50 having a grill 52. In FIG. 15 there is illustrated a single rod guard member 54, and in FIG. 16 there is illustrated a grill 56 secured to the rod 54. While several of these hinged guard portions have been illustrated, it is not intended that these hinged portions be limited to these particular forms, as any hinged segment of the guard which allows the mower housing to be moved adjacent a fixed object is deemed to be within the scope of the present invention.

The raising and lowering means for the hinged portion of the cutter blade guard is substantially the same for all types of hinged elements and for this reason only one detailed description is set forth, which is shown in FIGS. 11, 12, 13 and 14 and comprises a bifurcated element 30 fixed to the hinged portion 50 of the cutter blade guard and a bifurcated element 32 fixed to the remaining portion of the guard or mower housing. Pivotedly connected to the element 32 by the pin 33 is a knife-like bar 34 which is provided with a slot 36 extending lengthwise of the bar having an angled slot portion 36' connected therewith and formed at right angles to the slot 36 at the opposite end from the pivoted end of the bar 34. The element 30 is also provided with a fixed pin 38 adapted to slide within and along the slots 36 and 36'.

At the opposite end 34' of the bar 34 there is attached a pull and push type cable 40 carried within a flexible cable 42, the cable being operated by means provided at some remote location such as the levers 44 and 46 shown in FIG. 1.

Figure 11:
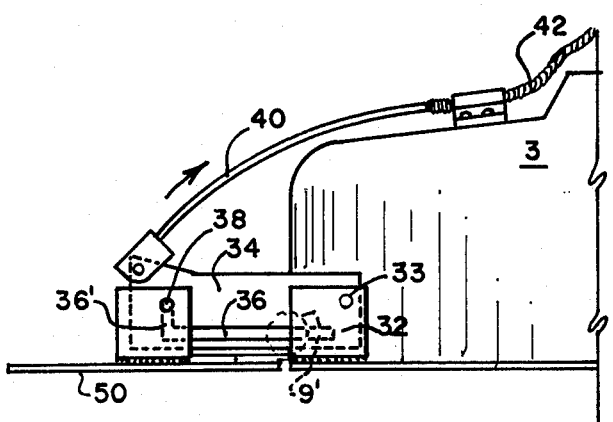
FIG. 11, 12 and 13 are fragmentary elevational views looking from the left of FIG. 14 on line x—x of a detailed form of means for locking the hinged portion of the cutter blade guard in substantially the same plane as the remaining guard elements and for moving the same to a position 90° from the plane thereof.
Figure 13:
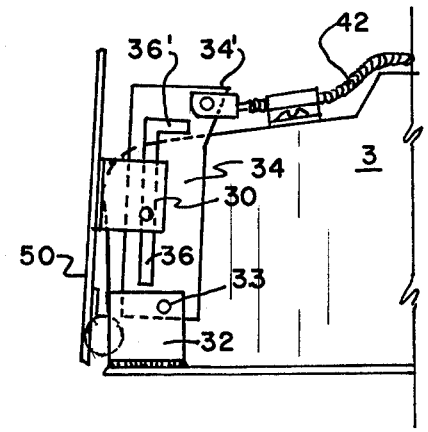

When the bar 34 is in its extended position as shown in FIG. 11, and the pin 38 is in the slot portion 36', the movable portion 50 of the cutter blade guard will be locked in horizontal position and in a plane substantially parallel with the cutter blade 2.

Figure 12:
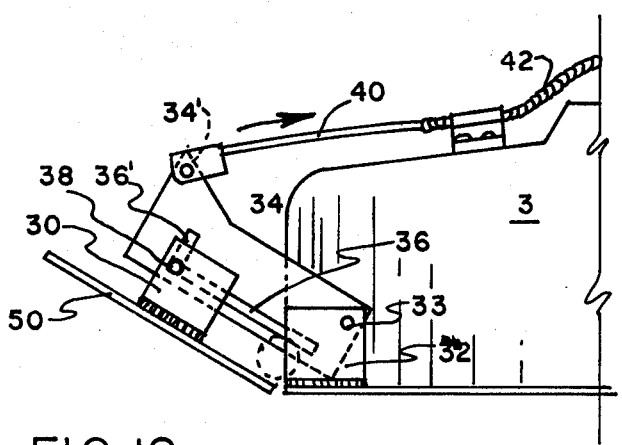

In operation, as the cable 40 is withdrawn the free end 34' of the bar 34 is raised until the pin 38 moves to the outer ends of the slot 36 as shown in FIG. 12. As the cable is further withdrawn the pin 38 moves inwardly along the slot 36 raising the hinged portion 50 to a substantially perpendicular position and in a plane substantially perpendicular to the plane of the cutter blade 2. When the cable is released, the hinged portion of the guard 50 will return to its position as previously described for FIG. 11 by a coiled spring 9' associated with the hinge 9, or by any other suitable means, and will re-engage the locking pin.

With this arrangement of raising sections of the guard member at the sides of the mower, the mower housing, carrying the cutter blade, may be moved in close proximity of an object such as a fence, building, tree, bush, etc., after which the hinged guard sections may be quickly and easily returned to their normal horizontal locked position.

While the specifications and drawings show and describe a specific type of apparatus, it is not intended to be a limitation as the scope of the invention is best defined in the appended claims.

I claim:

1. In combination, a wheel-supported rotary type mower having a closed top and an open bottom housing, and wheel-supporting means supporting the mower housing being on front and rear axes for allowing a back and forth manipulating said mower in said back and forth movement, a propeller type cutter blade rotatably supported within said housing in a horizontal plane adjacent the bottom of the housing, and means for rotating said cutter blade, a cutter blade guard fixed to the housing in a substantially horizontal plane, the cutter blade guard being in a plane adjacent the bottom of the housing and below the plane of the rotatable cutter blade, the improvement comprising; said cutter blade guard being fixed to each side of said housing and having a hinged portion wherein the edge of each hinged portion adjacent the housing extends in parallel lines from front to rear of each side of the mower and in planes perpendicular to the axes of the wheel-supporting means, hinged means for connecting each of the said hinged portions to said housing, means for moving the hinged portions of the cutter blade guards between the substantially horizontal and a substantially vertical position and means for remotely operating the moving means.

2. In combination, a wheel-supported rotary type mower having a closed top and an open bottom housing, and wheel-supporting means supporting the mower housing being on front and rear axes for allowing a back and forth movement of the mower, and a handle secured to said mower for manipulating said mower in said back and forth movement, a propeller type cutter blade rotatably supported within said housing in a horizontal plane adjacent the bottom of the housing, and means for rotating said cutter blade, a cutter blade guard fixed to the housing in a substantially horizontal plane, the cutter blade guard being in a plane adjacent the bottom of the housing and below the plane of the rotatable cutter blade, the improvement comprising; said cutter blade guard being fixed to at least one side of said housing and having a hinged portion wherein the edge of said hinged portion adjacent the housing extends in a line from front to rear of the side of the mower and in a plane perpendicular to the axes of the wheel-supporting means, hinged means for connecting the said hinged portions to said housing, means for moving the hinged portion of the cutter blade guard between the substantially horizontal and a substantially vertical position and means for remotely operating the moving means.

* * * * *